United States Patent

McKnight

[15] 3,705,467

[45] Dec. 12, 1972

[54] SOIL BED PREPARATION, SOIL STABILIZING, SOIL CONDITIONING, AND SOIL IMPROVING PROCESS

[72] Inventor: James T. McKnight, 8 Fawn Lane, Martinsville, N.J. 08836

[22] Filed: May 27, 1971

[21] Appl. No.: 147,642

[52] U.S. Cl..............47/9, 47/DIG. 10, 106/287 SS, 61/36 R
[51] Int. Cl................................A01n 7/02
[58] Field of Search....47/DIG. 10, 58, 1, 9; 61/36 R; 106/287 SS

[56] References Cited

UNITED STATES PATENTS

| | | | |
|---|---|---|---|
| 2,625,471 | 1/1953 | Mowry et al. | 47/DIG. 10 |
| 2,946,155 | 7/1960 | Barnhill | 47/58 |
| 3,174,942 | 3/1965 | Erikson et al. | 47/58 X |
| 3,320,696 | 5/1967 | Wright et al. | 47/9 |
| 3,387,405 | 6/1968 | Iwasyk et al. | 47/9 |
| 3,545,130 | 12/1970 | Strother et al. | 47/58 |

*Primary Examiner*—Robert E. Bagwill
*Attorney*—Sherman & Shalloway

[57] ABSTRACT

A method of seed bed preparation, and soil improvement, conditioning, and stabilization comprising coating soil particles with a reactive high molecular weight cationic polymer or latex so as to form coated, positively charged soil particles and reacting coated, charged soil particles with an anionic alkali-treated lignin binder to provide a film or a network on the soil of sufficient wet strength to provide the soil with resistance to rainfall and water runoff. In addition to effectively stabilizing the soil, the soil treatment method accelerates the rate of seed germination and decreases the loss of valuable fertilizer material and seed.

14 Claims, No Drawings

SOIL BED PREPARATION, SOIL STABILIZING, SOIL CONDITIONING, AND SOIL IMPROVING PROCESS

This invention relates to an improved method of seed bed preparation and soil improvement, conditioning and stabilization. More particularly, this invention relates to an improved method of soil improvement comprising coating soil particles with a cationically charged polymer or a latex and subsequently reacting the coated soil particles with an anionic lignin binder.

There have been numerous prior art attempts to achieve an effective method for stabilizing soil so as to improve its resistance to erosion and to make it more suitable for plant life. Generally, these prior art compositions and methods apply a mixture of cationic and anionic polyelectrolytes to the soil in order to achieve the soil stabilization and conditioning which allows the propogation of plant life. Examples of prior art soil conditioning methods and compositions are found in the following U.S. Pat. Nos. 2,545,130 and 2,839,417.

Other prior art methods and compositions for stabilizing and improving soils comprise the application of a single polyelectrolyte composition to the soil material such as are shown in the following U.S. Pat. Nos. 2,703,276, 2,735,756, 2,893,166, and 3,281,987.

However, these prior art methods and compositions have not proved totally successful and have not achieved widespread acceptance since they either require the use of gel inhibitors or the materials useful in the methods of the prior art are either too expensive for wide range and extensive use or do not have sufficient soil stabilization properties for use on a large scale, such as for the stabilization of highway embankments prior to the establishment of plant growth or the reclamation of soils which are generally not conducive to plant growth, such as clay and other types of soil.

It has now been found that soils may be effectively stabilized and plant growth induced using the following method which employs low cost materials so as to be applicable for wide-spread use. Briefly, the method of the present invention comprises coating soil particles with a high molecular weight, cationically charged polymer or latex material to form coated, positively charged soil particles and reacting these coated, positively charged soil particles with an anionic alkali-treated lignin binder to form a film or network on the soil of sufficient wet strength to reduce soil erosion and accelerate the rate of seed germination.

It is, therefore, the principle object of the present invention to provide a low cost, simple method for effectively stabilizing soils and improving the seed germinating qualities of the same.

It is a further object of the present invention to provide a method for stabilizing soil using an anionic alkali-treated lignin material.

It is a still further object of the present invention to provide a method for stabilizing soils and improving the same which may be applied without elaborate machinery and without special additives such as gel inhibitors, viscosity reducers, etc.

Still further objects and advantages of the process of the present invention will become more apparent from the following, more detailed description thereof.

The method of the present invention comprises coating soil particles with a reactive, cationically charged binding material in order to form coated, positively charged soil particles and reacting the coated, charged soil particles with an anionic alkali-treated lignin binder to provide a film or network on the soil of sufficient wet strength to provide adequate resistance to rainfall and water runoff.

The process of the present invention provides a method for stabilizing soils and embankments against wind and water erosion and comprises the separate application to the soil of the cationically and anionically charged binder materials. Although it is not necessary to the process of the present invention, it is preferable to apply the cationic material first as noted above. This is especially true since it is preferable to apply the lignin material last, and most commercially available inexpensive forms of lignin suitable for use in the process of the present invention are anionic.

The positively charged cationic bonding materials include high molecular weight, water soluble cationic or amphoteric polyelectrolytes or a dispersion or latex of positively charged polymer particles. Preferably, the cationic material should have a molecular weight of 500,000 or higher. The polymer latexes may be prepared from acrylate polymers prepared by conventional procedures but substituting lower molecular weight and cationic polyelectrolytes for the soaps and gums normally used to prepare the aqueous dispersions of these polymers. The only requirements for the cationic binding materials are that they be of sufficient molecular weight, i.e., above 500,000, that they are sufficiently cationic and reactive that they adhere to soil particles, especially those containing a slightly negative charge and that they are coagulated by anionic lignin extracts, especially alkali-treated lignin. Generally, high molecular weight, water soluble cationic or cationic amphoteric polyelectrolytes are sufficiently reactive if they have a sufficient excess of cationic character and if the bond between these materials and the soil particles is not destroyed by the coagulation with alkali-treated lignin anionic extracts. Specific examples of suitable cationic latexes, dispersions, and polymer solutions will be described hereinafter.

Although the preparation of specific cationic binder materials will be described hereinafter, the following classes of cationic polymers are satisfactory for use in the process of the present invention since each may be prepared with a high molecular weight and an excess of cationic sites: aminoalkyl esters of polycarboxylic acids as described in U.S. Pat. No. 3,372,149; latexes of homopolymers of vinyl acetate and copolymers of vinyl acetate with butyl acrylate, ethyl acrylate maleic anhydride, etc.; quaternary salts of acrylate homopolymers and copolymers; etc.

Although there are a number of lignins commercially available, many of these lignins are produced by extracting the lignin from cellulosic raw materials using treatments which degrade the natural polymer and reduce its molecular weight, thus rendering it unsuited for use in the process of the present invention. It has been found, however, that certain lignin extracts which have been treated with alkali, i.e., weak black liquor, Kraft black liquor, when combined with the above noted cationic binder materials produce a soil structure with suitable soil stabilization properties as described above. Generally, the alkali treatment comprises treating cellulosic materials with a solution containing various alkaline materials such as sodium hydroxide, potassium hydroxide, and sodium sulfide. The cellulosic material and/or lignin extract possibly after acid pretreating is then cooked in the presence of this alkaline material for a number of hours.

The application of the cationic material to the soil prior to its coagulation with the anionic lignin binder is critical to the satisfactory performance of the process of the present invention. If the same materials which give excellent results when applied according to the process of the present invention are mixed prior to their application on the soil, inferior and unsatisfactory soil stabilization results.

Although the mechanism by which the process of the present invention stabilized the soil is not fully understood, it appears that a film or network of particles including soil particles coats the soil. However, the particular mechanism described should not be limiting since the method of the present invention might stabilize the soil by other mechanisms.

The method of the present invention can be practiced using any conventional soil treating apparatus, such as a tractor equipped with a sprayer. Since the combination of the cationic materials with the soil occurs quite rapidly, the anionic material can be applied shortly after the application of the cationic materials. One practical method for practicing the method of the present invention is to mount conventional spray apparatus in tandem on a tractor, the first sprayer applying the cationic material and the second sprayer applying the anionic material. As noted above, the method of the present invention can be used with conventional agricultural spray apparatus since the materials applied by the method of the present invention are not of high viscosity requiring the use of special applicator apparatus.

The materials applied to the soil according to the method of the present invention are applied in the ratio of 15 to 0.15 parts by weight cationic solids per part by weight of anionic solids. It is preferred that the ratio of cationic material to anionic material be within the range of from 0.75:1 to 1.25:1. Further, the minimum effective application rate of the materials according to the method of the present invention is 5 pounds/acre of cationic material and 5 pounds/acre of anionic material. Although any amount over the above noted minimum can produce effective soil stabilization, it has been found that application rates above 150 pounds solids/acre of cationic and 150 pounds solids/acre of anionic are not generally practical economically since normally no increased soil improvement occurs. However, under unusual circumstances when treating especially arid and unsuited soils, application rates above these practical maximums may be necessary.

The following examples illustrate the preparation of various cationic polyelectrolytes and alkali-treated lignin extracts suitable for use in the soil stabilization process of the present invention. These examples are for the purpose of illustration only and are to be in no way taken as limiting since any other cationic and anionic materials exhibiting similar properties may be used in the process of the present invention.

EXAMPLE A

Three hundred ten gms of de-ionized water, 8.0 gms of a commercial imidazoline stearate, 4.5 ml of 98 percent formic acid, and 1 ml of a 1% solution by weight of ferric chloride are placed into a polymerization vessel equipped with stirrer, condenser, and thermometer. The solution is heated to 60°C and 40 gms of vinyl acetate are added and stirred for 10 minutes at 60°C, after which 33 ml of a solution of 3.9 ml of 100 volume hydrogen peroxide dissolved in 100 ml of water is added. The polymerization vessel is then heated by means of an external water bath and the contents of the vessel maintained at a temperature of 75°C. When the vinyl acetate ceases to reflux, 360 gms of vinyl acetate and 70.9 ml of a solution of 3.9 ml of 100 volumes of hydrogen peroxide in 100 ml of water are added gradually over a period of 4½ hours keeping the temperature of the vessel contents between 75°C and 80°C. After the addition of vinyl acetate and hydrogen peroxide solution is complete the vessel contents are heated to 85°C for 45 minutes and then cooled.

The product is a stable dispersion of fine particle size, the majority of the particles being less than 1 micron in diameter, and having a total solids content of 48 percent.

When diluted to 10 percent solids the dispersion remains stable even when heated to 80°C.

Copolymers of vinyl acetate with butyl acrylate may be produced by using a mixture of vinyl acetate and butyl acrylate in place of the vinyl acetate. Further cationic starch materials such as Kato-Cote and Cato-8, modified cationic starches, may be incorporated into the starting materials as well as quaternary acrylate derivatives as described in U.S. Pat. Nos. 3,329,706 and 2,667,679.

EXAMPLE B

An aqueous solution containing 12.5 percent of a copolymer of methacrylic acid, epichlorohydrin, and trimethylamine, produced as disclosed in U.S. Pat. No. 3,329,706, 12.5 percent of the quaternary of dimethyl aminoethyl methacrylate with dimethyl sulfate as disclosed in U.S. Pat. No. 2,667,679 and 0.05 gms potassium persulfate in an aqueous solution is reacted at 55°C for 4 hours. The product produced is a stiff gel and is added to 550 ml of water in a Waring Blender. The gel is dissolved by beating at high speed and charged to a 2 liter kettle with 75 gms of a 49 percent solution of the quaternary product of dimethyl aminoethyl methacrylate with dimethyl sulfate and the kettle is purged with nitrogen while heating at 50°C. At 50°C, 10 percent of a mixture of 390 gms styrene and 180 gms ethyl acrylate are added, together with 1.5 gms potassium persulfate. The polymerization is initiated by adding 8.0 ml of a 2 percent sodium bisulfite solution and when the temperature reaches 55°C the remaining premixed monomers are added dropwise. During the addition of the additional premixed monomers, an additional 40 ml of bisulfite solution is also added and, at the completion of the addition of the monomer mixture, the temperature is raised to 85°C, and held for a half hour while an additional 25 ml of bisulfite solution is added. Upon cooling, a coagulant and grit free emulsion of 1100 cps viscosity measured at 25°C is obtained showing a total solids content of 49.1%.

EXAMPLE C

Seventy-five gms of dimethyl aminoethyl methacrylate is added to 425 gms of oxygen free water. This solution is buffered to pH 3.5 to 5 by adding concentrated sulfuric acid while mixing vigorously. 0.25 gms of potassium persulfate, dissolved in 10 ml of water, is then added and the resulting mixture heated to 55°C for 4 hours. Upon cooling, the solution is ready for dilution or use directly as the cationic component of the process of the present invention.

EXAMPLE D

Two hundred forty-two parts of an aqueous solution containing 20.6 percent, by weight, of polyacrylic acid having an I.V., i.e. an intrinsic viscosity, of 0.5 in dioxane at 25°C are placed into a reaction vessel containing means for mechanical agitation. This solution is heated with agitation to a temperature of 70°C and maintained throughout the entire course of the reaction. Next, 16.45 parts of ethyleneimine are slowly introduced into the agitated polymer solution; the addition of the ethyleneimine is completed over a period of 60 minutes. After further agitation for another 30 minute period, the viscosity of the solution increases considerably.

Then, 104 parts of water and 70 parts of a mixture containing equal parts, by weight, of concentrated hydrochloric acid and water are added and the mixture is agitated for 15 minutes. The introduction of the water decreases the viscosity of the solution. The remaining portion, i.e. 16.45 parts of ethyleneimine, is slowly added over a period of 60 minutes and agitation is then continued for an additional 30 minutes. To complete the reaction, another 81 parts of the 1:1 hydrochloric acid:water mixture are added and the resulting solution is cooled to room temperature.

EXAMPLE E

In preparing this derivative, the basic procedure described in Example D, hereinabove, is again utilized with the exception, in this instance, that a total of only 29.9 parts of ethyleneimine is reacted with the polyacrylic acid. The latter concentration of ethyleneimine is exactly equivalent to the molar concentration of available carboxyl groups in the polyacrylic acid whereas the 32.9 parts of ethyleneimine which had been utilized in Example D represents an excess of the latter reagent equivalent to 1.1 moles of the available carboxyl groups in the polyacrylic acid. In the resulting product, only about 95 percent of the available carboxyl groups is converted.

EXAMPLE F

One hundred fifty parts of an aqueous solution containing 18.0 percent, by weight, of polyacrylic acid having an intrinsic viscosity of 0.5 in dioxane at 25°C are placed into a reaction vessel containing means for mechanical agitation. This solution is heated with agitation to a temperature of 70°C maintained throughout the entire course of the reaction. Next, 34.5 parts of N-hydroxyethyl ethyleneimine are slowly introduced into the agitated polymer solution over a period of 60 minutes. After further agitation for another 30 minute period, the viscosity of the solution has increased considerably.

Then, 19 parts, by weight, of concentrated hydrochloric acid are added and the mixture is agitated for 15 minutes. The remaining portion, i.e. 17.25 parts of N-hydroxyethyl ethyleneimine are slowly added over a period of 60 minutes and the agitation is continued for an additional 30 minutes. To complete the reaction, another 19.5 parts of concentrated hydrochloric acid are added and the resulting solution is cooled to room temperature.

EXAMPLE G

In preparing this derivative, the basic procedure described in Example F, hereinabove, is again utilized with the exception, in this instance, that a total of only 31.0 parts of N-hydroxyethyl ethyleneimine is reacted with a polyacrylic acid. This concentration of N-hydroxyethyl ethyleneimine utilized is the exact molar equivalent of the available carboxyl groups in the polyacrylic acid whereas the concentration utilized in Example F represents an excess of the latter reagent equivalent to 1.1 moles of the available carboxyl groups in the polyacrylic acid. The product of this example has about 95 percent of the available carboxyl groups converted.

The cationic polymer solutions produced using Examples E – G can be diluted to 10% or lower solids content and used as the cationic component of the process of the present invention.

EXAMPLE H

One part, by weight, of a 0.1 percent solution of a vinyl acetate, maleic anhydride copolymer in methyl ethyl ketone is reacted with two parts, by weight, of a 0.2 percent solution of polyethyleneimine having a molecular weight of approximately 60,000 in methyl ethyl ketone. The mixture is mixed gently and warmed to 40°C and after standing for 24 hours, a gel layer forms on the bottom. The excess solvent and reactants are decanted and this gel is washed with additional methyl ethyl ketone four times. A volume of water equal to the gel layer is added along with sufficient phosphoric acid to give a pH of 4.0 after vigorous beating in a blender. The excess methyl ethyl ketone is then removed from the water dispersion of the cationic material by 3 ether extractions. The resultant dispersion contains approximately 0.4 percent polymer solids and can be used directly as the cationic material in the process of the present invention.

The following two Examples illustrate the preparation of alkali-treated lignin materials suitable for use in the process of the present invention and are not to be taken as limiting since any lignin material with similar properties may be utilized in the process of the present invention.

EXAMPLE I

A 300 gm blend of hardwood and softwood chips is charged to a pressure vessel provided with a circulating pump along with 1000 ml of the solution 7 percent sodium hydroxide and 3 percent sodium sulfide. The chips are then cooked for 3 hours at 175°C with recirculation at the rate of 200 cc per minute. The cooked liquor is then cooled by adding 500 ml of cold water and drained from the reactor and evaporatively cooled to 25°C to yield a solution generally referred to as weak black liquor. The resulting product produced by this example is anionic and of high molecular weight.

EXAMPLE J

Three hundred gms of beechwood chips, 0.5 to 2 mm thick, are treated with 1500 ml of 6 percent nitric acid for 1 hour at 100°C. The mixture is then cooled at 25°C and neutralized by adding solid potassium hydroxide while circulating the liquor through the chips. Sufficient potassium hydroxide is added so that a 50 gm excess is added and the resulting solution and chips are heated to 98°C for about 1 hour with recirculation. The resulting liquor is then separated from chips and, after cooling, can be used in the same way as the Kraft weak black liquor described above.

SMALL SCALE TEST PROCEDURES

The process of the present invention is demonstrated utilizing the following small scale tests for soil stabilization.

A disposable tray having the following dimensions, 8½ × 4½ × 2½ inches, is filled with from 550 to 650 gms of dry granulated soil (preferably a friable clay) gently leveled and provided with a drainage opening 2½ inches wide, cut to the depth of the top of the soil surface in one end of the tray. The soil surface is then subjected to the prescribed soil treatment process and placed at a 45° angle with the open end of the tray on the bottom of a container sufficiently deep and wide to contain any splatter from the subsequent experimental "rain storm." The treated soil samples are then subjected to a "rain storm" of from 650 to 750 ml of water in 10 minutes, delivered from a positive displacement metering pump to 2¼ inch internal diameter Tygon tubes. This "rain storm" has a free fall of approximately 5½ ft. and impinges on the tray in two defined elliptical areas along this center line of the tray. The soil removed from the tray by this rain storm and in the water flowing down the tray and out of the cut opening at the end is collected in the large container and is rinsed into a one liter Imhoff sedimentation tube where it is allowed to settle out for approximately 30 minutes and the amount of sediment collected is recorded. A wide range of soil samples from three different areas of the country, namely, eastern river valley, midwestern river valley, and southern uplands, give a total sediment, erosion loss, value in mls ranging from 40 ml to 100 ml or more. If a good, naturally stabilized bottom land top soil or black humus is tested, the values are much lower, i.e., within the range of from 15 to 25 ml. Thus, a reduction of the total soil loss in this test to 25 ml or less was taken as the criteria for effective soil stabilization. As an alternative criterion, with samples known to be extremely susceptible to erosion, a two or three fold reduction in the loss was also taken as a criterion for successful soil stabilization.

The soil treating solutions were applied in about 2 to 30 ml volume sprayed as very fine droplets from a paint sprayer as uniformly as possible over the entire surface of the tray. When using the process of the present invention, the spray of cationic material was followed by the spray of lignin solution. Unless otherwise noted, the sprayed soil was then dried in a forced draft oven at 120°C. for 40 minutes before applying the "rain storm" test.

A subsequent modification of the test procedures subjected the prepared tray of dry soil to a preliminary rain storm of 120 ml volume with the tray held level approximately 4½ ft. below the level of the tubing outlets. In this case, the tray is moved about so as to apply the rain storm uniformly over the entire surface of the tray, thereby consolidating the surface and dispersing the finer soil particles to make them better able to serve as linking bridges between the larger soil particles, thereby vastly increasing the effectiveness of various soil treatments. This test procedure is used to compare the effectiveness of the various anionic and cationic materials produced as shown in the Examples A – J and also a number of anionic and cationic commercially available materials which have been found to be unsuited for the process of the present invention.

The process of the present invention will be now more fully explained by the following illustrative examples which are included for the purpose of illustration only and are not to be taken as limiting in any respect.

EXAMPLE 1

Using the modified test procedure, the soil in each tray was sprayed with 30 ml of a 10-fold solution of the anionic or cationic dispersions as noted in Table I, except that the lignin produced from Example I was diluted 40-fold. These soil samples were then subjected to the "rain fall" test and the percentage of sediment was compared against an untreated soil sample. The percentage of standard soil erosion loss is the amount of sediment resulting from each of the soil samples treated as noted in Table I divided by the amount of soil erosion loss on the untreated sample multiplied by 100.

TABLE I

Effect of Net Charge on the Soil Stabilizing Action of Latex Dispersion

| Type of Latex | % of Standard Soil Erosion Loss |
|---|---|
| Anionic Latex R1103 from National Starch | 100% |
| Cationic Latex from Example B alone | 25% |
| Cationic Latex from Example B subsequently coagulated on the soil with lignin from Example I | 10% |

EXAMPLE 2

Again using the modified test procedure, soil samples were sprayed with 30 ml of each of the solutions as shown in Table II. Also, other concentrations of each component used separately were tested, and in no instance was the soil erosion loss rate reduced as low as 20 percent, i.e. these soil stabilizing effects are not additive.

TABLE II

Effect of Large Amounts of Cationic and Anionic Soil Stabilizing Components Separately and Combined

| | % of Standard Soil Erosion Loss |
|---|---|
| Cationic polymer solution from Example D diluted to 20-fold | 45% |
| Anionic lignin solution from | |

| | |
|---|---|
| Example I diluted 8-fold | 50% |
| Diluted polymer solution from Example D followed by diluted lignin solution from Example I | 20% |

As noted from above, the individual cationic and anionic polymer and lignin solutions, although reducing soil loss somewhat, do not effectively reduce soil loss. It should be further noted that the combination of these solutions, when applied according to the process of the present invention, significantly reduced the standard soil erosion loss down to an acceptable level.

EXAMPLE 3

The cationic polymer solution produced in Example D above is diluted 8-fold and sprayed at a rate of 400 gal. per acre to a prepared seed bed for a new lawn (perennial rye seed). The seed bed is prepared utilizing 400 lbs. per acre of limestone and 200 lbs. per acre of ammonium sulfate. Subsequent to the spraying with the cationic polymer solution, the soil is treated with a lignin solution prepared from Example I which has been diluted 4-fold and applied as a spray at the rate of 400 gals. per acre. A similar sized prepared seed bed is treated with water alone and the results compared. The seed bed treated according to the process of the present invention shows significantly accelerated seed germination and, also, prevents the 50–100 percent loss of seed and top soil which takes place on the untreated plots. This loss of seed and top soil results from a severe rain storm 8 days following planting. This same soil treatment also reduces the soil erosion loss in the small scale soil treatment test described above at a factor of more than 2.

EXAMPLE 4

The cationic polymer solution prepared in Example D above is diluted 40-fold and applied at a rate of 1600 gals. per acre to a freshly prepared seed bed of corn. This treatment was followed by an application of a lignin solution as prepared in Example I above diluted 16-fold at a rate of 1600 gals. per acre. A similar freshly prepared seed bed of corn is also prepared and the treated and untreated beds are both given daily water for 4 days. The treated bed produced 4 inches of growth in 4 days whereas the untreated seed bed had sprouted only one-fourth inch. The treatment of the present invention also reduces the soil erosion loss on the small scale test noted above by a factor of more than 2.

EXAMPLE 3

The cationic polymer solution prepared in Example D above is diluted 4-fold and applied to a freshly prepared seed bed at a rate of 100 gals. per acre and subsequently treated with a lignin solution as prepared in Example I above, which has been diluted 2-fold at an application rate of 100 gals. per acre. Again this seed bed showed significantly improved germination acceleration and prevented the loss of seed and top soil from heavy rains. Also, when measured on the small scale test, a 4-fold reduction in erosion loss rate is observed.

EXAMPLE 6

Using the procedure of Example 4, the lignin solution prepared as in Example J is substituted for the lignin solution prepared as in Example I. With this anionic material, essential fertilizer ingredients such as available nitrogen and potassium are included as an inherent part of the soil conditioning treatment. The erosion rate loss in the small scale test is reduced by more than a factor of 2 using the process of the present invention and this use of the fertilizer components does not adversely affect this result.

EXAMPLE 7

Utilizing the procedure of Example 4, the same materials are applied at a rate of 50 gals. per acre. In this case, the soil erosion rate in the small scale test is reduced by more than a factor of 2.

EXAMPLE 8

Utilizing the procedure of Example 4, the following cationic polymer solutions are used in place of the cationic solution prepared using the procedure of Example D in separate tests:
  a. Polymer solution produced using Example C;
  b. Polymer solution produced using Example E;
  c. Polymer solution produced using Example F; and
  d. Polymer solution produced using Example G.
  In each instance the rate of soil erosion, as measured on the small scale test, is reduced by more than a factor of 2.

EXAMPLE 9

The cationic polymer solution prepared in Example H is applied without dilution at a rate of 1600 gals. per acre followed by a treatment with lignin solution produced by Example I, diluted 16-fold and applied at a rate of 1600 gals. per acre. This soil treatment reduces the soil erosion rate loss in the small scale test by a factor of more than 2.

EXAMPLE 10

The latex dispersion produced using Example B is diluted 20-fold and applied at a rate of 1600 gals. per acre to a prepared seed bed of perennial rye grass. This is followed by a lignin solution prepared in Example I, diluted 20-fold and applied at a rate of 1600 gals. per acre. This combination of treatments reduces the soil erosion loss rate on the small scale test by a factor of more than 2 and significantly accelerates the rate of seed germination and significantly reduces the top soil and seed loss resulting from rains occurring shortly after planting.

EXAMPLE 11

The following materials are sprayed on the soil at a rate of 1600 gals. per acre. This treatment is followed by a lignin solution produced by Example I, diluted 8-fold.
  a. Kymene 557 (dicyandiamide-urea-formaldehyde condensation product);
  b. PEI 1120 (polyethylene-imine with a molecular weight of 100,000);
  c. Gafloc C–71 (vinyl pyrrolidone copolymer having cationic side chains);

d. Lufax 295 (the sulfate salt of a polymeric aliphatic amine);

e. Nalco 607 (a low molecular weight quaternary methyl ammonium chloride of the reaction product of ethylene dichloride and ammonia); and f. Vitipro (dried bovine serum).

Each of the above noted materials does not significantly improve the soil stabilization over that obtained using the lignin solution produced in Example I alone. Since each of the above noted materials either has a low molecular weight or does not have sufficient reactant or cationic sites, this shows the criticality of the molecular weight and the reactivity of the cationic materials for use in the process of the present invention.

EXAMPLE 12

A cationic polymer solution from Example D is diluted 20-fold and applied at a rate of 1600 gals. per acre to a prepared soil bed. Subsequent to this treatment, the soil bed is treated with the following anionic lignin compounds. These lignin compounds are generally produced using sulfite or sulfate processes:

a. Lignosol B (lignin sulfate (50% solids))

b. Orzan AH–3 (spray dried ammonium ligno-sulfonate)

c. Totanin (sulfite process lignin)

When utilized in the small scale test, the soil samples treated above do not reduce the soil erosion loss significantly more than that utilizing the cationic polymer solution from Example D alone. From the foregoing example, it is evident that it is necessary to the process of the present invention that the lignin material with properties similar to that produced using an alkali treatment, i.e., high molecular weight, water soluble, etc.

EXAMPLE 13

The cationic and anionic materials used in Example 3 were mixed prior to application on the soil. Using the small scale test procedure, only a minimal reduction in soil loss was noted, i.e., very little soil stabilization.

EXAMPLE 14

Using the procedure of Example 13, the following cationic and anionic materials were tested:

a. Cationic from Example D, anionic from Example J;

b. Cationic from Example E, anionic from Example I; and c. Cationic from Example G, anionic from Example J.

When each of the above materials were mixed, applied, and tested using the small scale test procedure, unsatisfactory soil loss reduction was noted.

While the process of the present invention has been described by way of the foregoing examples and specific embodiments, these examples and embodiments are in no way taken as limiting and the process of the present invention is to be construed as broadly as any and all equivalents of the following claims, which properly define the process of the present invention.

I claim:

1. A method of seed bed preparation, and soil improvement, conditioning and stabilization comprising applying a reactive high molecular weight cationically charged binding material to the soil to form coated charged soil particles and applying to said coated charged soil particles an anionic alkali-treated lignin binder to provide the soil with sufficient wet strength to resist rainfall and water runoff.

2. The method of claim 1 wherein the cationically charged binding material is selected from the group consisting of cationic water soluble polyelectrolytes and latexes of cationically charged polymer particles.

3. The method of claim 2 wherein the cationic material is applied at a rate of at least 5 pounds solids/acre and the anionic material is applied at a rate of at least 5 pounds solids/acre.

4. The method of claim 2 wherein the cationic binding material has a molecular weight greater than 500,000.

5. The method of claim 1 wherein the cationic material is applied at a rate of at least 5 pounds solids/acre and the anionic material is applied at a rate of at least 5 pounds solids/acre.

6. The method of claim 5 wherein the cationic binding material has a molecular weight greater than 500,000.

7. The method of claim 1 wherein the cationic binding material has a molecular weight greater than 500,000.

8. A method of seed bed preparation, and earth's surface improvement, conditioning and stabilization comprising applying a reactive cationically charged binding material to the surface to form coated charged surface particles and applying to said coated charged surface particles an anionic alkali-treated lignin binder to provide the surface with sufficient wet strength to resist rainfall and water runoff wherein the ratio of the cationic binding material to the anionic binding material is from 0.75:1 to 1.25:1.

9. The method of claim 8 wherein the cationically charged binding material is selected from the group consisting of cationic water soluble polyelectrolytes and latexes of cationically charged polymer particles.

10. The method of claim 9 wherein the cationic material is applied at a rate of at least 5 pounds solids/acre and the anionic material is applied at a rate of at least 5 pounds solids/acre.

11. The method of claim 9 wherein the cationic binding material has a molecular weight greater than 500,000.

12. The method of claim 8 wherein the cationic material is applied at a rate of at least 5 pounds solids/acre and the anionic material is applied at a rate of at least 5 pounds solids/acre.

13. The method of claim 12 wherein the cationic binding material has a molecular weight greater than 500,000.

14. The method of claim 8 wherein the cationic binding material has a molecular weight greater than 500,000.

* * * * *